United States Patent Office 3,554,695
Patented Jan. 12, 1971

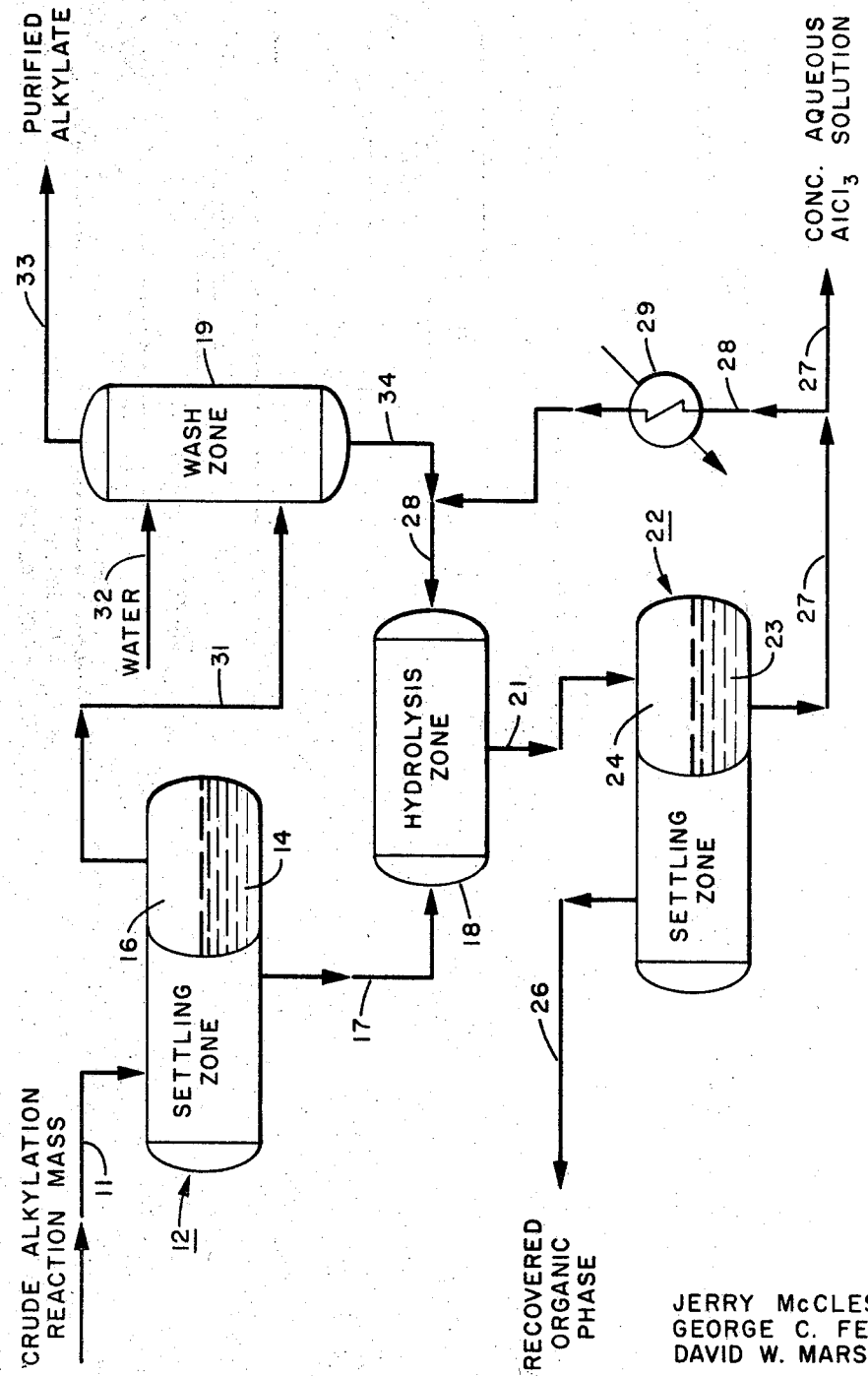

3,554,695
DISPOSAL OF SPENT ALUMINUM CHLORIDE ALKYLATION CATALYST SLUDGE
David W. Marshall, Severna Park, Md., Jerry McCleskey, Franklin Lakes, N.J., and George O. Feighner, Pasadena, Tex., assignors to Continental Oil Company, Ponca City, Okla., a corporation of Delaware
Filed Mar. 10, 1969, Ser. No. 805,684
Int. Cl. C01f 7/56, 7/62
U.S. Cl. 23—92                                     8 Claims

ABSTRACT OF THE DISCLOSURE

A method for separating aluminum chloride alkylation catalyst sludge from a mixture of product alkylate and sludge, is provided wherein the alkylate is separated from the sludge and passed through a washing zone. The liquid employed in the washing zone is then introduced into a hydrolysis zone wherein the separated sludge is hydrolyzed. The hydrolyzed sludge is then allowed to settle and form a water phase and an organic phase. A portion of the water phase, which contains the aluminum chloride, is then recycled to the hydrolysis zone and this recycle stream, coupled with the liquid wash stream from the wash zone, effects a desirable separation in the subsequent second settling zone.

BACKGROUND OF THE INVENTION

Field of the invention

This invention relates to the production of alkylates. In one aspect this invention relates to a process for the separation of the spent catalyst sludge obtained in the treatment of hydrocarbon with metal halides from an alkylate. In another aspect this invention relates to the recovery of a concentrated aluminum chloride solution from spent alkylation catalyst sludge. In another aspect this invention relates to a method for removing suspended sludge and dissolved gaseous HCl from the alkylate once the alkylate is separated from the majority of the sludge.

Brief description of the prior art

Friedel-Crafts catalysts, such as aluminum chloride, are widely used as catalysts in hydrocarbon systems, such as an olefin reaction with aromatics to form alkyl aromatics, or alkyl chloride reaction with aromatics to form alkyl aromatics. An important reaction which has been conducted commercially in the past several years has been in the manufacture of biodegradable detergent alkylates in which aluminum chloride is employed to catalyze the reaction of benzene with alkyl chlorides. However, in such a reaction a complex of aluminum chloride and organic compounds is formed as a by-product. This by-product is commonly referred to as "sludge." The sludge must be separated from the detergent alkylate. While a majority of the sludge will readily separate from the detergent alkylate upon standing, a minor amount of the sludge remains suspended in the detergent alkylate, along with a minor amount of dissolved gaseous HCl. The presence of the minor amount of sludge and dissolved gaseous HCl in the detergent alkylate can have a pronounced effect upon the quality of the detergent alkylate. Therefore, it is desirable to remove the quantities of suspended sludge and dissolved gaseous HCl from the detergent alkylate.

The majority of the sludge which is separated by settling or by electrostatic induced settling has, in the past, been hydrolyzed with an excess of water, thereby forming a dilute aqueous $AlCl_3$ solution which was discarded. While it has been recognized that it would be desirable to hydrolyze the separated sludge with a smaller amount of water and recover a concentrated $AlCl_3$ aqueous solution which could be marketed, such has not been feasible under existing conditions because, when one hydrolyzes the sludge with about 1 volume of water per volume of sludge which is necessary to form a concentrated $AlCl_3$ aqueous solution, an emulsion forms. This resulting emulsion is very difficult and impractical to break. Thus, the organic constituents, or the $AlCl_3$, present in the sludge cannot be separated and recovered. Therefore, in order to recover the organic constituents of the sludge, past practice has been to discard the dilute $AlCl_3$ aqueous phase. Thus, processes are constantly being sought wherein a concentrated $AlCl_3$ aqueous solution can be obtained while still providing separation and recovery of the organic constituents of the sludge. In addition to yielding a profit by the recovery of a concentrated $AlCl_3$ aqueous solution and the organic constituents from spent aluminum chloride alkylation catalyst, the recovery of the aqueous $AlCl_3$ solution results in the elimination of a major pollutant from plant waste water streams.

OBJECTS OF THE INVENTION

An object of the present invention is to provide an effective method for separating alkylation catalyst sludge from the alkylate.

Another object of the invention is to recover a detergent alkylate substantially free of dissolved HCl gas and suspended sludge.

Another object of the invention is to provide a method for recovering an aqueous aluminum chloride solution from the spent aluminum chloride alkylation catalyst sludge.

Another object of the invention is to provide a method for recovering a concentrated $AlCl_3$ aqueous solution from hydrolyzed spent aluminum chloride alkylation catalyst sludge.

These and other objects, features and advantages of the present invention will be apparent to those skilled in the art from the reading of the following detailed description and appended claims.

SUMMARY OF THE INVENTION

According to the present invention a method for separating spent aluminum chloride alkylation catalyst sludge from alkylate and recovering a concentrated aluminum chloride aqueous solution from said sludge is provided wherein the alkylation effluent containing the alkylate and spent alkylation catalyst sludge is passed from an alkylation zone into a first settling zone so that the effluent can form a lower sludge phase and an upper alkylate phase. The lower sludge phase is withdrawn from the first settling zone and passed to a hydrolysis zone where the sludge is hydrolyzed with an amount of water effective to provide a concentrated $AlCl_3$ solution. The hydrolyzed sludge is passed into a second settling zone so that the hydrolyzed sludge forms a water phase, containing the $AlCl_3$, and an organic phase. The water phase and organic phase are separated and the water phase is divided into a recycle stream and an aqueous product stream containing from about 25 to 35 weight percent aluminum chloride. The recycle stream is passed through a cooling zone and returned as a cooled recycle stream to the hydrolysis zone to maintain the temperature at the desired level within the hydrolysis zone.

The product alkylate which was originally separated from the sludge in the first settling zone is passed through a wash zone whereby substantially all of the remaining gaseous HCl and suspended sludge are removed from the alkylate. The liquid employed as the washing medium in the wash zone is passed to the hydrolysis zone to be mixed with the recycle stream to hydrolyze additional catalyst sludge and to cooperate with the recycle stream to facilitate more effective settling in the second settling zone.

BRIEF DESCRIPTION OF THE DRAWING

The figure is a schematic flow diagram of the method of the invention.

DESCRIPTION OF PREFERRED EMBODIMENTS

Detergent compositions prepared from biodegradable alkali metal salts of linear alkyl aryl sulfonates, such as sodium salt of linear alkyl benzene sulfonates, have been widely used in recent years. These sulfonates are manufactured by first producing a detergent alkylate which, upon sulfonation and neutralization, produces the biodegradable alkali metal salts of the linear alkyl aryl sulfonates. The detergent alkylate produced by the aluminum chloride catalyzed alkylation of an aryl compound with a chlorination product prepared by partially chlorinating a petroleum derived hydrocarbon fraction consisting essentially of $C_{10}$ to $C_{18}$ straight chain paraffins, as disclosed in U.S. Pat. No. 3,316,294 (1967), has produced a by-product known as sludge which is a complex of organic compounds and the spent aluminum chloride catalyst.

It is to the treatment of the effluent from the alkylation reaction which contains alkylate and catalyst sludge in order to provide an alkylate substantially free of suspended sludge and dissolved gaseous HCl, and at the same time, recovery of a concentrated $AlCl_3$ aqueous solution that the present invention is directed. The term "concentrated $AlCl_3$ aqueous solution," as used in the present disclosure is an aqueous solution containing from about 25 to 35 weight percent $AlCl_3$. The concentrated $AlCl_3$ aqueous solution recovered by the process of the present invention can be treated by any suitable method to purify said solution so that same can be marketed as a technical grade aqueous $AlCl_3$ solution. An effective process for purifying the aqueous $AlCl_3$ solution recovered from alkylation catalyst sludge according to the present invention is disclosed in the co-pending application of Weiss entitled, "Recovery of Aluminum Chloride From Spent Aluminum Alkylation Catalyst Sludge," U.S. Ser. No. 805,876 filed Mar. 10, 1969.

Referring now to FIG. 1 of the drawings there is depicted a schematic flow diagram of the method of removing catalyst sludge from the alkylate and the recovery of a concentrated $AlCl_3$ aqueous solution from said catalyst sludge of the present invention. Effluent, i.e. crude alkylation reaction mass, from the alkylation reaction zone (not shown) is passed via conduit 11 into a first settling zone 12, wherein the effluent is maintained at a temperature within the range of about 120 to 180° F. for a sufficient period of time to allow the effluent to form a lower sludge phase 14 and an upper alkylate phase 16. Preferably, the effluent is maintained at a temperature of about 140 to 170° F. for a residence time of about 30 to 60 minutes in first settling zone 12. After the separation of sludge phase 14 and alkylate phase 16, sludge phase 14 is withdrawn from first settling zone 12 and passed via conduit 17 to hydrolysis zone 18 where sludge phase 14 is contacted with an amount of water effective to hydrolyze sludge phase 14. The water which is fed into hydrolysis zone 18 is the wash effluent from wash zone 19, wherein alkylate phase 16 is washed to remove suspended catalyst sludge and dissolved gaseous HCl.

Hydrolysis zone 18 is equipped with suitable agitation means so as to provide thorough mixing of the water and sludge. The reaction mass of the sludge and water is maintained at a temperature of about 140 to 160° F. for a period of time to allow substantially all of the sludge to be hydrolyzed. When the sludge has been hydrolyzed the hydrolyzed sludge is withdrawn from hydrolysis zone 18 and passed via conduit 21 to a second settling zone 22 wherein the hydrolyzed sludge forms a lower water phase 23 and an upper organic phase 24. Any suitable phase separating equipment, such as a gravity settler or electrostatic settler can be employed as the apparatus for both the first settling zone 12 and second settling zone 22.

The hydrolyzed sludge is maintained in second settling zone 22 at a temperature within the range of about 120 to 180° F. for a period of time effective to form water phase 23 and organic phase 24. Preferably, the hydrolyzed sludge is maintained at a temperature of 140 to 170° F. for a residence time of about 30 to about 60 minutes in second settling zone 22. Organic phase 24 is then withdrawn from second settling zone 22 and passed via conduit 26 to a purification and separation zone (now shown) for recovery of the desired organic constituents. Such purification and separation processes are well known in the art.

Water phase 23 is withdrawn from second settling zone 22 via conduit 27. Water phase 23 is the concentrated aluminum chloride aqueous solution containing from about 25 to 35 weight percent $AlCl_3$. Waste phase 23 passing via conduit 27 is divided into a recycle stream and a product stream. The recycle stream which is passed through conduit 28 which is in fluid communication with conduit 27 is returned to hydrolysis zone 18 at a rate sufficient to maintain a volume ratio of concentrated aluminum chloride aqueous solution to catalyst sludge in hydrolysis zone 18 of about 2:1 to 15:1. Preferably, the volume ratio of concentrated aluminum chloride aqueous solution to catalyst sludge in hydrolysis zone 18 is about 6:1. Further, we prefer to employ a recycle stream containing about 25 to 27 weight percent $AlCl_3$ in order to insure that the $AlCl_3$ does not come out of the aqueous solution.

The recycle stream, prior to introduction into hydrolysis zone 18 via conduit 28 is first passed through cooling zone 29 which is positioned between conduit 27 and hydrolysis zone 18. Cooling zone 29 can be of any suitable equipment, such as a water cooled heat exchanger. The cooling of the recycle stream is important because the temperature of the exothermic hydrolysis reaction is controlled by means of controlling the temperature of the recycle stream and passing the recycle stream into hydrolysis zone 18 so as to maintain the desired temperature range within hydrolysis zone 18. By controlling the temperature and the amount of cooled recycle stream returned to hydrolysis zone 18 one can maintain the temperature in hydrolysis zone 18 within the range of about 120 to 180° F.

Alkylate phase 16 which was originally separated from lower sludge phase 14 in first settling zone 12 contains a minor amount of suspended catalyst sludge and dissolved gaseous HCl. As previously stated, the presence of even the minor amount of suspended catalyst sludge and dissolved gaseous HCl in the alkylate produces undesirable effects on the quality of the product. In order to remove the suspended catalyst sludge and gaseous HCl, upper alkylate phase 16 is withdrawn from first settling zone 12 and passed via conduit 31 to wash zone 19 wherein the undesired contaminants are removed from the alkylate product stream with a wash liquid. Preferably, the wash procedure is a continuous process whereby the wash liquid is injected into wash zone 19 at the upper portion of wash zone 19 via conduit 32 and alkylate phase 16 is introduced into the lower portion of wash zone 19 via conduit 31. The washing of the alkylate is carried out at a temperature within the range of about 70 to 150° F. Purified alkylate is withdrawn from the upper portion of wash zone 19 and passed via conduit 33 to a storage means (not shown). The wash liquid, which now contains the suspended catalyst sludge and dissolved gaseous HCl which was removed from the alkylate phase, is withdrawn from the lower portion of wash zone 19 via conduit 34 and passed to hydrolysis zone 18 wherein said wash liquid and recycle stream cooperate to hydrolyze lower sludge phase 14 and, at the same time, facilitate the phase separation of the concentrated $AlCl_3$ aqueous solution in second settling zone 22. If desirable, conduit 34 can be in fluid communication with conduit 28 carrying the recycle stream at a point between cooling zone 29 and hydrolysis zone 18 as shown in the drawing.

The wash liquid employed in the above-described countercurrent extraction of suspended catalyst sludge and dissolved gaseous HCl from the alkylate is a dilute aqueous $AlCl_3$ or water. The wash effluent will contain the removed $AlCl_3$ and thus, in effect, a dilute aqueous $AlCl_3$ solution even when water is employed as the wash liquid. However, care must be exercised when employing a dilute aqueous $AlCl_3$ solution as the initial wash fluid to insure that the resulting concentrated $AlCl_3$ aqueous solution formed in second settling zone 22 does not exceed 35 weight percent $AlCl_3$ due to the decreasing solubility of the $AlCl_3$ solution at higher concentrations and the HCl concentration effect on the solubility. Desirable results have been obtained where the initial wash fluid injected into the upper portion of wash zone 19 contains up to about 20 weight percent $AlCl_3$. It is evident to those skilled in the art that one may need to add fresh water to either the wash effluent, the recycle stream, or the hydrolysis zone to maintain the desired $AlCl_3$ concentration in the concentrated aqueous $AlCl_3$ solution, especially when dilute aqueous $AlCl_3$ solution is employed as the wash liquid.

By practicing the invention in the method contemplated the concentration of the aluminum chloride solution generated can be maintained within the range of about 25 to 35 weight percent $AlCl_3$ by controlling the amount of wash liquid used to countercurrently extract the suspended aluminum chloride catalyst cludge and gaseous HCl from alkylate phase 14 in wash zone 19.

The portion of the aluminum chloride aqueous solution which is not employed as the recycle stream is considered the product stream as to the recovery of the aluminum chloride from the spent catalyst. The aqueous aluminum chloride solution resulting from the treatment described in detail above contains impurities which must be removed before the aluminum chloride solution can be classified as a marketable technical grade aluminum chloride solution. The purification of the aluminum chloride solution can be by any method. However, we prefer to use that method disclosed in the copending application of Weiss entitled "Recovery of Aluminum Chloride From Spent Aluminum Chloride Alkylation Catalyst Sludge," U.S. Ser. No. 805,876, filed Mar. 10, 1969.

To further illustrate the best manner contemplated for carrying out the invention, the following working examples are set forth. As indicated, these examples are primarily given by way of illustration, and accordingly any emumeration of details set forth therein are not to be interpreted as a limitation of the invention except as such limitations are indicated in the appended claims.

EXAMPLE I

A series of experiments were conducted to determine the optimum conditions for separation of hydrolyzed alkylation catalyst sludge into an organic phase and a water phase. In each experiment the catalyst sludge was separated from a crude detergent alkylate reaction product mixture obtained by the aluminum chloride catalyzed alkylation of benzene with partially chlorinated (approximately 20 percent chlorinated) $C_{11}$ to $C_{12}$ normal paraffins as per U.S. Pat. 3,316,294 (1967). The separated sludge was then hydrolyzed at a temperature ranging from 140 to 170° F. The sludge was hydrolyzed with 1 to 2 volumes of water per volume of sludge. The hydrolyzed sludge was then passed to a settling zone which was maintained at a temperature of about 165° F. The hydrolyzed sludge was maintained in said settling zone for a period of about 1 hour during which time said sludge formed a water phase containing $AlCl_3$ and an organic phase. The amount of $AlCl_3$ present in the water phase was about 25 to 30 weight percent. The water phase was then divided into a recycle stream and a product stream. Varying amounts of the recycle stream were introduced into the hydrolysis zone to determine the effect of said recycle stream on the subsequent phase separation of said hydrolyzed sludge. Data illustrating the results of these experiments are tabulated in Table I.

TABLE I

| | Ratio (volume) | | Phase separation of hydrolyzed sludge | Remarks |
| --- | --- | --- | --- | --- |
| | Recycle: sludge | Water: sludge | | |
| Experiment No.: | | | | |
| 1 | 0:1 | 1:1 | Poor | Emulsion formed. |
| 2 | 1:1 | 1:1 | do | Produced a thick emulsion which did not break in 5 days. |
| 3 | 3:1 | 2:1 | Good | Produced a fairly clear solution in about 1 hour—a clear solution in 24 hours. |
| 4 | 6:1 | 1:1 | do | Clear solution and good phase separation in 1 hour. |
| 5 | 12:1 | 1:1 | do | Clear solution—good phase separation in 30 minutes. |

The conditions employed in the above runs produced a water phase of an aqueous aluminum chloride solution containing from about 25 to 30 weight percent $AlCl_3$ (by Al analysis) solution. A higher concentration of $AlCl_3$ solution can be obtained, approaching 30 to 35 percent $AlCl_3$, by using a dilute (15 percent) $AlCl_3$ solution rather than fresh water or by adding less fresh water. When employing the dilute $AlCl_3$ solution, one still obtains good phase separation of the hydrolyzed sludge. However, care must be exercised to prevent the $AlCl_3$ from coming out of solution when the concentration of the $AlCl_3$ is over 30 percent by weight $AlCl_3$. However, when producing an $AlCl_3$ solution containing our preferred amount, namely 25 to 30 percent $AlCl_3$, no problem of precipitation of $AlCl_3$ is incurred. Further, the use of fresh water is preferred rather than the dilute $AlCl_3$ solution because it allows one to more easily control the concentration of $AlCl_3$ in the solution.

In producing a concentrated $AlCl_3$ solution containing about 25 to 35 weight percent $AlCl_3$, one preferably utilizes a ratio of water to sludge of about 1:1 in the hydrolysis zone. The data above indicates that when using such a ratio of water to sludge alone an emulsion is formed. However, by employing a recycle stream containing $AlCl_3$ one can readily prevent the formation of the emulsion.

EXAMPLE II

A series of experiments were conducted to demonstrate the step of the removal of suspended catalyst sludge and dissolved gaseous HCl from the alkylate product stream according to the present invention. Crude alkylate reaction product mixture obtained by the aluminum chloride catalyzed alkylation of benzene with partially chlorinated (approximately 20 percent chlorinated) $C_{12}$ to $C_{14}$ normal paraffins as per U.S. Pat. No. 3,316,294 (1967) was settled to remove a major portion of the $AlCl_3$ sludge present from the alglyation reaction. The separated crude alkylate was pumped upward through a packed column containing approximately 15 percent aqueous $AlCl_3$ solution at a rate of 180–200 mls./minute.

Two sixes of packed columns were employed in the experiments. Column No. 1 was 1½ inches in diameter and had a bed of ¼ inch Raschig rings 4½ inches high with an overflow tube 1½ inches above the bed. Column No. 2 was 3½ inches in diameter and had a bed of ¼ inch Raschig rings 8½ inches high with an overflow tube approximately 3 inches above the bed. The columns were filled with a 15 percent aqueous $AlCl_3$ solution so that the $AlCl_3$ solution covered the Raschig rings. The effluent crude alkylate, i.e. the washed alkylate, was collected from the overflow and analyzed for percent $AlCl_3$ and total acidity to determine the effectiveness of the washing step and such results are shown in Table II.

TABLE II

| | Washing temperature, °F. | Total acidity, meq./g. | Percent $AlCl_3$ |
|---|---|---|---|
| Crude alkylate before treatment | 75–80 | 0.03 | 0.08 |
| Crude alkylate after treatment: | | | |
| Column I | 75–80 | 0.011 | 0.04 |
| Column II | 75–80 | 0.008 | 0.03 |

The above data clearly illustrates the effective removal of the suspended sludge and gaseous HCl from the crude alkylate by the washing step of the present invention.

The aqueous $AlCl_3$ solution employed in the above-described washing step can then be used, in combination with the recycle stream, to hydolyze the separated catalyst sludge. The ratio of the two streams, i.e. the wash effluent and the recycle stream, will be governed by the $AlCl_3$ content of the sludge being hydrolyzed and the desired concentration of $AlCl_3$ in the $AlCl_3$ liquor being recovered.

The foregoing discussion and description has been made in connection with preferred specific embodiments wherein preferred temperature ranges have been recited in connection with the various steps employed in the recovery of a concentrated aqueous $AlCl_3$ solution from spent aluminum chloride alkylation catalyst sludge. However, it is to be understood that the recited temperature ranges and the discussion and description are intended to illustrate and teach those skilled in the art how to practice the invention, and such is not to unduly limit the scope of the invention, which is to be found in the claims set forth hereinafter.

Having thus described the invention, we claim:

1. A method for recovering a concentrated $AlCl_3$ aqueous solution from spent $AlCl_3$ alkylation catalyst sludge in combination with recovering a purified alkylate which comprises:
  (a) passing effluent containing alkylate and sludge from an alkylation zone into a first settling zone thereby allowing said effluent to form a lower sludge phase and an upper alkylate phase;
  (b) withdrawing said sludge phase and passing same to a hydrolysis zone wherein said sludge is hydrolized;
  (c) withdrawing said hydrolyzed sludge and passing same into a second settling zone thereby allowing said hydrolyzed sludge to form a concentrated $AlCl_3$ aqueous phase containing from about 25 to 35 weight percent $AlCl_3$ and an organic phase;
  (d) separating said concentrated $AlCl_3$ aqueous phase from said organic phase;
  (e) dividing said separated concentrated $AlCl_3$ aqueous phase into a recycle stream and a product stream;
  (f) passing said recycle stream through a cooling zone;
  (g) returning the cooled recycle stream to said hydrolysis zone at a rate effective to maintain a volume ratio of recycle stream to sludge in said hydrolysis zone of about 2:1 to 15:1 and at a temperature effective to maintain the temperature in said hydrolysis zone within the range of about 140 to 160° F;
  (h) passing the alkylate of step (a) through a wash zone containing a wash liquid to remove substantially all of the remaining gaseous HCl and suspended $AlCl_3$ sludge from said alkylate and recovering from said wash zone a purified alkylate; and
  (i) passing said wash liquid to said hydrolysis zone to cooperate with said recycle stream to hydrolyze said sludge and facilitate phase separation of said hydrolyzed sludge in said second settling zone.

2. The method of claim 1 where said effluent in said first settling zone and said hydrolyzed sludge in said second settling zone are maintained at a temperature within the range of about 120 to 180° F.

3. The method of claim 2 wherein said effluent and said hydrolyzed sludge are maintained at a temperature within the range of about 140 to 170° F. for a residence time of about 30 to 60 minutes.

4. The method of claim 3 wherein said wash liquid is selected from the group consisting of water and dilute aqueous $AlCl_3$ solution containing up to about 20 weight percent $AlCl_3$ and the washing step is carried out at a temperature within the range of about 70 to 150° F.

5. The method of claim 4 wherein said concentrated $AlCl_3$ aqueous recycle stream contains about 25 to 27 weight percent $AlCl_3$.

6. The method of claim 5 wherein said alkylate is passed countercurrently through said wash zone and said method of recovering said concentrated $AlCl_3$ aqueous solution is a continuous process.

7. The method of claim 6 wherein said cooled recycle stream is returned to said hydrolysis zone at a rate effective to maintain a volume ratio of recycle stream to sludge of about 6:1.

8. The method of claim 7 wherein said sludge is hydrolyzed with about a 1:1 volume ratio of water to sludge.

References Cited

UNITED STATES PATENTS

| 2,228,707 | 1/1941 | Roberts et al. | 23—96X |
| 2,471,054 | 5/1949 | Amick, Jr. | 23—96X |
| 2,525,830 | 10/1950 | Sailors et al. | 23—96 |
| 3,316,294 | 4/1967 | Feighner et al. | 260—505 |

EDWARD STERN, Primary Examiner

U.S. Cl. X.R.

260—505, 683.53